UNITED STATES PATENT OFFICE.

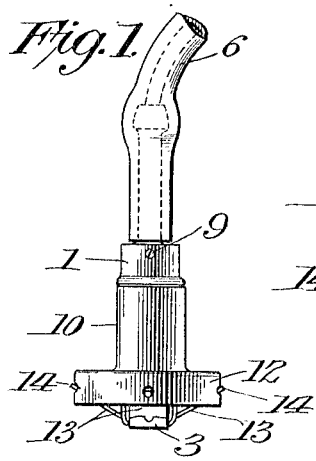
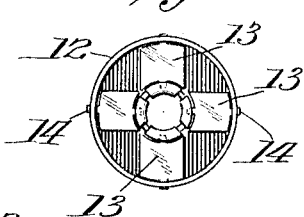
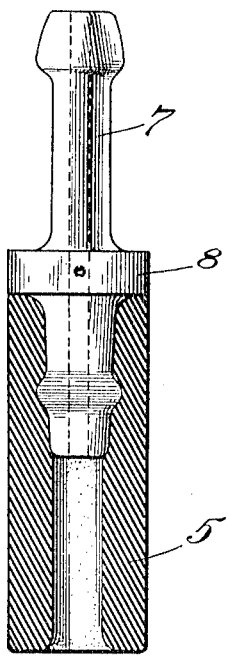
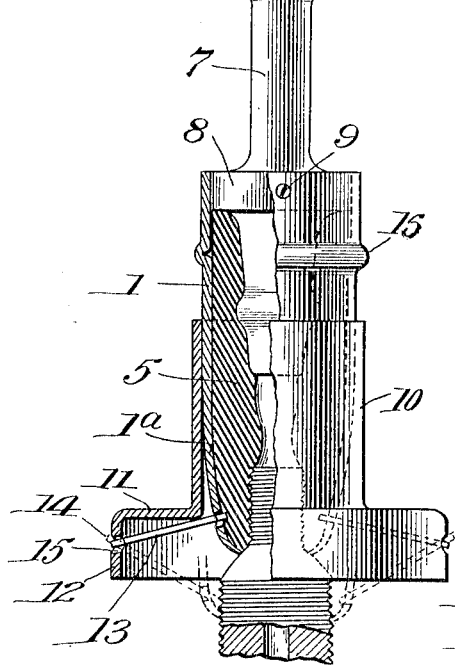
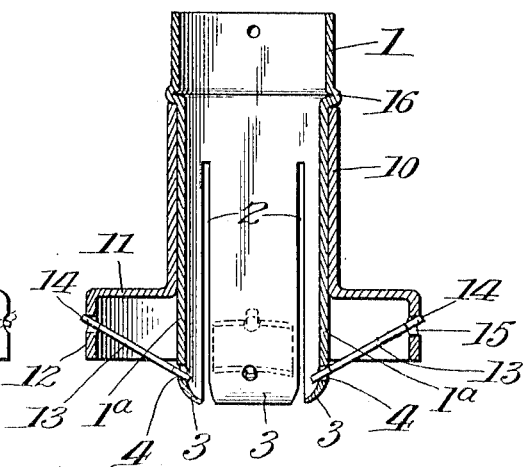

CLYDE H. SMITH AND FRANK L. PARKMAN, OF SKOWHEGAN, MAINE.

DETACHABLE PIPE-COUPLING.

1,120,340.        Specification of Letters Patent.       Patented Dec. 8, 1914.

Application filed May 7, 1914. Serial No. 837,027.

*To all whom it may concern:*

Be it known that we, CLYDE H. SMITH and FRANK L. PARKMAN, citizens of the United States, residing at Skowhegan, in the county of Somerset and State of Maine, have invented certain new and useful Improvements in Detachable Pipe-Couplings, of which the following is a specification.

This invention relates to devices for making an air-tight coupling between a pump or a tank of compressed air or liquid and an automobile tire or other container into which fluid is to be conveyed.

The device is of the detachable type, and the construction is such that it can be quickly applied and disconnected.

The invention consists in a tube slit lengthwise from one end for a portion of its length so that spring arms are formed; a rubber or other compressible lining in said tube forming a terminal for the hose that conducts the air or liquid to the coupling; a sleeve that slides lengthwise on the tube; and two or more toggle members which abut at their outer ends against a flange on the sleeve and at their inner ends against the free ends of the spring arms. The construction is such that when the sleeve is moved in one direction the toggle members cause the spring arms to compress the rubber lining upon a nipple or other pipe end thrust into it, and when the toggle members pass the dead center of their play they will lock the parts together. A movement of the sleeve in the opposite direction will unlock the toggles and release the nipple or the like, so that the coupling can be detached.

In the accompanying drawing, Figure 1 is a side elevation of our improved pipe coupling as it appears when about to be applied to a nipple or other pipe terminal. Fig. 2 is an end view of said coupling. Fig. 3 shows the coupling on a much larger scale and partly broken away to show portions in section, being represented in its applied or coupled position. Fig. 4 is a sectional view on the same large scale, with the compressible lining removed from the tube, and Fig. 5 shows one of the toggle members.

The coupling has a tubular body 1 of steel or other resilient metal which is provided with a plurality of longitudinal slots 2 extending part of its length from one end. We have shown four such slots, but the number may be varied at will. The free ends of the spring arms 1ª thus formed are preferably turned inward to form hooks 3, and are perforated at 4 just above said hooks. A lining 5 of rubber or other compressible material is inserted in the tube 1, its outer end being held by the hooks 3. This lining forms the terminal of the hose 6 which conducts the air or liquid to the coupling, these parts being connected by a shouldered coupling tube or connector 7 having a collar 8 which fits into the upper end of the tube 1 and is fastened thereto, as by the pins 9.

A sleeve 10 slides on the tube 1 and has a flange 11 preferably carrying a rim 12 which serves as an abutment for a plurality of toggle members 13, grouped around the tube and the compressible hose terminal. These toggle members are preferably flat plates having tongues 14 at their ends, which enter the holes 4 in the spring arms 1ª and also holes 15 in the rim 12. Said toggle members are preferably arranged radially to the tube 1, and are inclined downwardly when the sleeve is in its uppermost position, as shown in Figs. 1 and 4. Each pair of diametrically opposite toggle members constitutes a toggle joint acting upon the spring arms with which its members engage.

The operation is as follows: When the coupling is detached, the parts stand as shown in Fig. 1 and Fig. 4, the sleeve 10 being slid up along the tube 1 until it is stopped by a collar or bead 16 on said tube. The spring arms 1ª are spread apart, so that if the coupling is applied to a nipple 17 or other suitable connection for a valve stem of an automobile tire, a receiving tank, or other container, said nipple or the like will easily enter between said arms. If now the sleeve 10 is slid downwardly along the tube 1, the inner ends of the toggle members 13 will be compelled to approach each other as the outer ends of said toggle members are carried downward, so that the spring arms will be forced inwardly and will contract the lining 5 upon the nipple. The position of the holes 15 in the rim 12 is such that the toggle members can pass the plane of said holes and assume an oblique position before striking the end of the sleeve, as appears in Fig. 3. This passing of the dead center causes the toggle members to lock themselves in this innermost position, so that when the coupling has been applied to the nipple it will remain connected thereto without any further effort on the part of the operator. To disengage the coupling, a slight upward pull on the sleeve will cause the toggle members to pass below the plane of the holes 15, whereupon the resiliency of the arms 1ª will spread them apart and release the nipple.

In accordance with the provisions of the patent statutes, we have described the principle of operation of our invention together with the apparatus which we consider to represent the best embodiment thereof; but we desire to have it understood that the apparatus shown is only illustrative, and that the invention can be carried out by other means.

Having thus described our invention, what we claim is:—

1. A detachable pipe coupling, comprising a compressible hose terminal, toggles composed of members grouped radially around said terminal, and means for causing said toggles to pass their dead center and contract said terminal.

2. A detachable pipe coupling, comprising a compressible hose terminal, spring arms inclosing said terminal, toggle members bearing on said spring arms, and means for actuating said toggle members.

3. A detachable pipe coupling, comprising a tubular body having spring arms, a lining of compressible material, a sleeve sliding on said body, and toggle members between said sleeve and said arms.

4. A detachable pipe coupling, comprising a tube slotted from one end to form spring arms, a lining of compressible material in said tube, a sleeve sliding on said tube and having a flange, and toggle members abutting between said flange and said arms.

5. A detachable pipe coupling, comprising a tube slotted lengthwise from one end to form spring arms, a lining of compressible material in said tube, a sleeve sliding on said tube having a flange provided with a rim, and radial toggle members abutting between said rim and the ends of said arms.

6. A detachable pipe coupling, comprising a tube slotted from one end to form spring arms, a lining of compressible material in said tube, a sleeve sliding on said tube and having a flange provided with a rim, and toggle members consisting of plates having tongues at their ends engaging with said rim and the ends of said arms.

7. A detachable pipe coupling, comprising a tube slotted from one end to form spring arms, said arms having hooked ends, a lining of compressible material in said tube held by said hooked ends, a sleeve sliding on said tube, and toggle members between said sleeve and said arms.

8. A detachable pipe coupling, comprising a tube slotted to form spring arms, a lining of compressible material in said tube, a sleeve sliding on said tube and having a flange, and toggle members abutting between said flange and arms and adapted to pass the dead center when said sleeve is slid outwardly on said tube.

9. A detachable pipe coupling, comprising a tube having spring arms, a lining of compressible material therein, a connector engaging with said lining and having a collar fastened in the end of said tube, and toggle members for compressing said arms and lining.

In testimony whereof we affix our signatures in presence of two witnesses.

CLYDE H. SMITH.
FRANK L. PARKMAN.

Witnesses:
HELEN M. LUCE,
ANNIE RODERICK.

Copies of this patent may be obtained for five cents each, by addressing the "Commissioner of Patents, Washington, D. C."